Dec. 8, 1931.                A. LINCOLN                1,835,957
OIL AND GAS SEPARATOR
Filed May 9, 1930
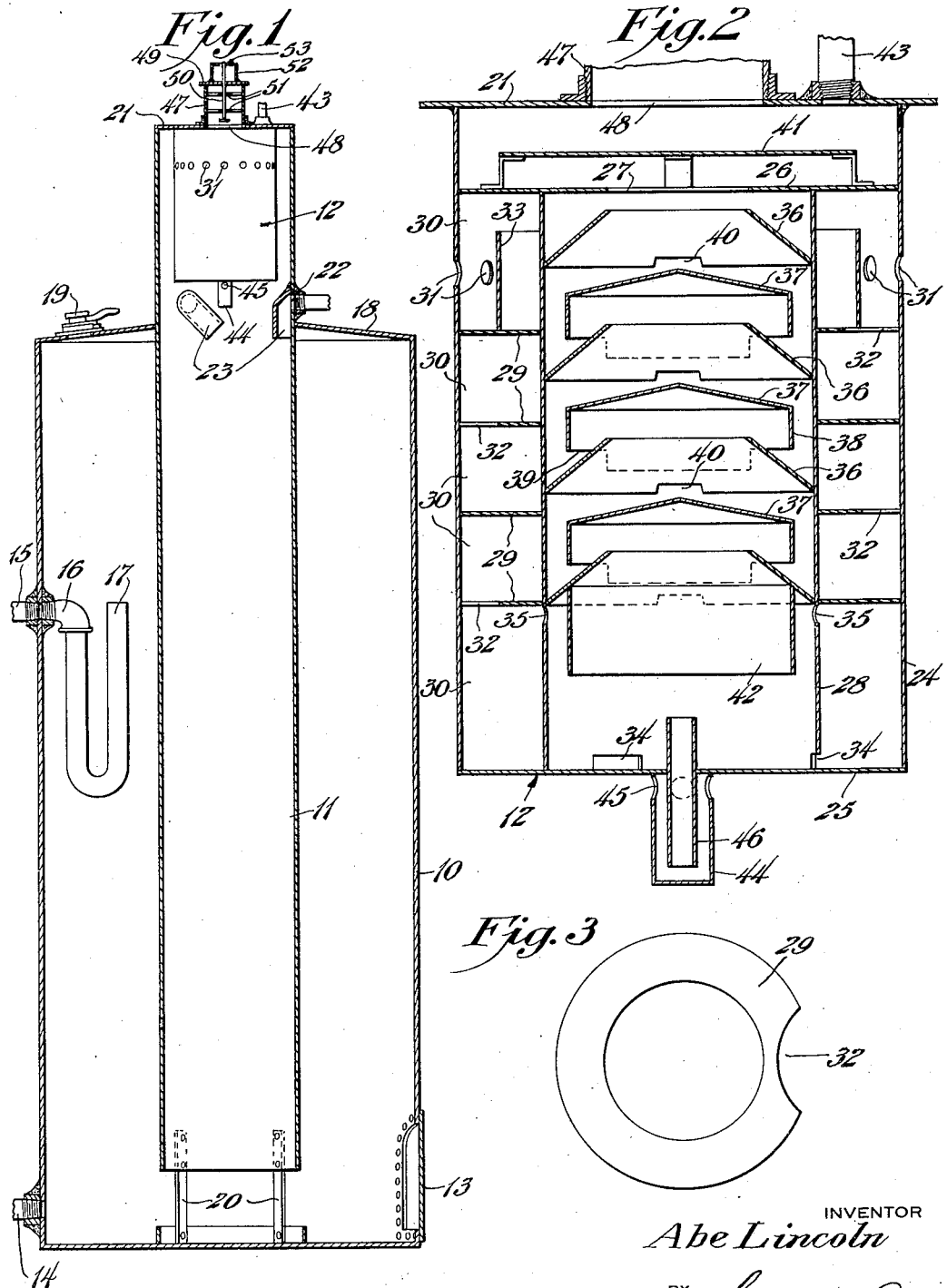
INVENTOR
*Abe Lincoln*
BY
*Siggers & Adams*
ATTORNEYS Patented Dec. 8, 1931

1,835,957

UNITED STATES PATENT OFFICE

ABE LINCOLN, OF ELECTRA, TEXAS

OIL AND GAS SEPARATOR

Application filed May 9, 1930. Serial No. 451,036.

This invention relates to oil and gas separators and, among other objects, aims to provide an improved apparatus to effect the separation of gas and oil, especially under low pressure.

In the accompanying drawings showing a preferred embodiment of the invention,

Fig. 1 is a central longitudinal section taken through the improved apparatus;

Fig. 2 is a central longitudinal section, on an enlarged scale, through the gas separator unit in the upper portion of the apparatus; and Fig. 3 is a plan view of one of the baffles employed in the apparatus.

Referring particularly to the drawings, the apparatus is there shown as comprising an upright oil settling tank 10 having a relatively large conductor pipe 11 extending above the top of the tank and housing a gas separator unit 12. The tank 10, near its lower end, is provided with a clean-out opening, normally closed by a plate 13, and also with a salt water drain outlet 14. An oil outlet pipe 15 is connected to the wall of the tank above its mid portion; and within the tank and connected to the outlet by an elbow 16 is a U-shaped overflow pipe 17 providing a liquid seal for the outlet. The top 18 of the tank is crowned and provided with a conventional vacuum valve 19.

The conductor pipe 11, which is relatively large in diameter, has its lower end supported above the bottom of the tank on legs 20, while the upper end extends through and above the top 18 and is closed by a cover plate 21. The pipe 11 above the top 18 is provided with a plurality of inlet openings 22 adapted to be connected to inlet pipes for conducting the fluid to be separated.

Within the pipe 11 and communicating with each inlet 22 are nozzles 23, each of which is arranged to direct the incoming fluid downwardly at an angle and against the inner surface of the pipe 11. Thus the fluid flows in a spiral path around the inner wall of the pipe 11 and at no increase in pressure, thus reaching the oil level, which is approximately the top of the pipe 17, with a minimum of agitation, thereby preventing, to a great extent, the formation of oil and water emulsion. Due to the comparative capacity of the tank and the outlet pipe, the fluid moves very slowly, thus allowing ample time for the water, sand, etc. to settle out. As the fluid enters the pipe 11, the gas and oil vapor, being lighter than the oil and water, rises in the pipe 11 and enters the separator or filter unit 12, which is arranged above the inlet openings 22.

The separator unit 12 is shown in Fig. 2 as comprising a cylindrical casing 24 secured at its upper end to the cover plate 21 and closed at the bottom by an end or bottom wall 25. Extending across the casing and spaced below the plate 21 is a partition 26 having a central opening 27 therein, and extending between the partition 26 and the bottom wall 25 and secured to both is a smaller cylindrical shell 28 preferably concentric with the housing 24. A plurality of spaced transverse baffles 29 extend between and are secured to the cylinders 24 and 28 to provide a plurality of annular chambers 30.

A plurality of inlet openings 31 are provided in the casing 24 between the partition 26 and the upper baffle 29 and each baffle 29 has a peripheral outlet opening 32 (Fig. 3) arranged in staggered relation to the corresponding opening in the next adjacent baffle. A cylindrical baffle 33 extends upwardly from the upper baffle 29 to a point above the inlet openings 31 and its lower edge extends partially over the outlet opening 32 in the upper baffle 29. As the gaseous oil vapor enters the casing 24 through the openings 31, it strikes the baffle 33, causing some of the oil particles to be deposited on the baffle and finally run down into the upper baffle 29 and around to the opening 32. Some of the vapor is deflected upwardly and over the baffle 33, striking the partition 26 and shell 28, and the separated oil falls into the space between the baffle 33 and the shell 25 and flow around to the opening 32.

In addition to the separated oil, the gaseous oil vapor passes down through openings 32 in the upper baffle to the next lower chamber 30, around the shell 28 to the next lower opening 32 and so on until it reaches the lowest chamber. In its tortuous path more of the oil is separated by the oil particles in the vapor striking the surfaces of the shell 28, the housing 24 and the baffles 29, and finally it falls to the bottom of the separator unit, where it is free to pass into the shell 28 through openings 34 at the bottom. The gas and the remaining vapor pass into the shell 28 through inlet openings 35 just below the lowest baffle 29.

To separate the gas from the oil vapor in the shell 28, a plurality of frusto-conical baffles 36 and conical baffles 37 having depending annular flanges 38 are arranged horizontally and alternately in the shell. The baffles 36 are open at the top and have their lower edges secured to the inside of the shell 28, the lowest baffle 36 being just above the openings 35, while the top baffle 36 is just below the opening 27 in the partition 26. The conical baffles 37 are smaller in diameter than the frusto-conical baffles 36 and have their depending flanges secured to the upper surface of the baffles 36. Portions of the lower edges of the depending flanges 38 are cut away to provide outlets 39, and notches are formed in the peripheral edges of the baffles 36 to provide drain openings 40. Supported on legs shown in elevation in Fig. 2 above the opening 27 in the partition 26 is a circular deflector plate 41 and secured to the lowest frusto-conical baffle 36 is a depending cylindrical baffle 42 which is spaced from the shell 28 and extends below the openings 35.

As the vapor passes through the openings 35 into the shell 28, it strikes the baffle 42, passing around its lower edge and then up through the opening in the lowest frusto-conical baffle 36, striking the under surface of the conical baffle 37 and is deflected downwardly through the openings 39. It then passes up through the next baffle 36 and so on to the top of the shell 28, where it passes through the opening 27 and strikes the plate 40 where it is deflected outwardly and upwardly around the peripheral edge. As the vapor strikes the various surfaces of the baffles, etc., the oil particles are deposited on the various surfaces and pass down onto the upper surfaces of the frusto-conical baffles 36 and through the outlets 40 until it reaches the bottom of the shell 28. The gas which remains when the oil has been separated leaves the separator through an outlet in the plate 21 to a conduit 43.

In order to let the oil out of the separator 12 and at the same time provide a liquid seal so that the gas cannot flow back into the pipe 11, a cup-shaped reservoir 44 is secured at its upper edge to the bottom wall 25 and has outlet openings 45 at the top of the side wall. An overflow tube 46 extends from near the bottom of the reservoir through and above the bottom wall 25. The oil in the separator 12 flows over the top of the tube 46 down into the reservoir and leaves the reservoir through the openings 45, where it falls into the oil in the pipe 11.

To permit the gas to escape should the pressure become too great, a safety valve is provided at the top of the separator. Herein, the valve is shown as comprising a cylindrical body portion 47 secured at its lower edge to the plate 21 and above an outlet opening 48 in the plate. The top of the body 47 provides a valve seat for a valve 49 having a guide stem 50 depending therefrom and mounted in suitable guides 51. A hollow compartment member 52 is mounted on top of the valve 49 and has a closure plug 53, which may be removed so that the compartment may be filled with metal slugs, lead or other heavy material to furnish the necessary weight for the desired pressure under which the valve is to open.

It is to be noted that the various parts in the separator unit 12 are so arranged that oil drains from all of the surfaces with which it contacts to the bottom of the casing 24, and also that, due to the tortuous path the gaseous fluid must take in passing through the separator, practically all of the oil is reclaimed so that only the gases leave through the conduit 43.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In an oil and gas separator, the combination of an upright tank; a relatively large conductor pipe extending from near the bottom, through and above the top of the tank, said pipe being closed at the top and open at the bottom; fluid inlets in the pipe above the top of the tank; an oil outlet for the tank; a cylindrical casing in the upper portion of the pipe and above the inlet openings in the pipe; a cylindrical shell arranged axially within the casing and having inlet openings near the bottom; a plurality of spaced annular baffles extending between the casing and shell, each baffle having an opening therein; said casing having a plurality of inlet openings above the top baffle; a gas conduit at the top of the casing; an oil outlet at the bottom of the casing; a plurality of alternate frusto-conical and conical baffles in the shell; and a partition extending across the casing at the top of the shell and having a central opening therein communicating with the inside of the shell.

2. In an oil and gas separator, the combination of an upright tank; an oil outlet for the tank; a relatively large upright conductor pipe partially within the tank, said pipe being closed at the top and open at the bottom; fluid inlets in the conductor pipe; a casing in the upper end of the pipe; a shell within the casing; annular baffles extending between the shell and the casing and each having a drain opening therein; alternately arranged frusto-conical and conical baffles in the shell; inlets in the casing near the top; inlets in the shell near the bottom; and an outlet at the top of the casing and communicating with the interior of the shell.

3. In an oil and gas separator, in combination, an upright tank; an outlet for the tank located at an intermediate point; an upright pipe in the tank and extending through the top of the tank; said pipe being closed at the top and communicating with the inside of the tank at the bottom; a cylindrical casing depending from the top of the pipe; inlets in the pipe above the tank and below the casing; inlets in the casing; a cylindrical shell in the casing; spaced transverse, frusto-conical baffles in the shell and having their lower peripheral edges notched and secured to the shell and being open at the top; conical baffles between the frusto-conical baffles and having depending flanges secured to the tops of the frusto-conical baffles; said flanges having openings at the bottom; inlets in the shell below the lowest frusto-conical baffle; a baffle depending from the lowest baffle and extending below the shell inlets; and an outlet communicating with the opening in the top frusto-conical baffle.

4. In an oil and gas separator, in combination, an upright tank; an outlet for the tank located at an intermediate point; an upright pipe in the tank and extending through the top of the tank; said pipe being closed at the top and communicating with the inside of the tank at the bottom; a cylindrical casing depending from the top of the pipe; inlets in the pipe above the tank and below the casing; inlets in the casing; a cylindrical shell in the casing; spaced transverse, baffles secured to the shell and being open at the top; inlets in the shell below the lowest baffle; a baffle depending from the lowest baffle and extending below the shell inlets; an outlet for gas at the top of the pipe; and a pressure-operated escape valve also at the top of the pipe.

5. In an oil and gas separator, in combination, an upright tank; an outlet for the tank; an upright pipe in the tank and extending through the top of the tank; said pipe being closed at the top and communicating with the inside of the tank at the bottom; a cylindrical casing depending from the top of the pipe; inlets in the pipe above the tank and below the casing; inlets in the casing; a cylindrical shell in the casing; spaced baffles horizontally arranged in the shell; inlets in the shell below the lowest baffle; a baffle depending from said lowest baffle and extending below the shell inlets; and an outlet communicating with the opening in the top frusto-conical baffle.

6. In an oil and gas separator, in combination, an upright tank; a relatively large conductor pipe extending from near the bottom, through and above the top of the tank; said pipe being closed at the top and open at the bottom; fluid inlets in the pipe above the top of the tank; an oil outlet for the tank; a cylindrical casing in the upper portion of the pipe and above the inlet openings in the pipe; a cylindrical shell arranged axially within the casing and having inlet openings near the bottom; a plurality of spaced annular baffles extending between the casing and shell, each baffle having an opening therein; said casing having a plurality of inlet openings above the top baffle; a gas conduit at the top of the casing communicating with the interior of the shell; an oil outlet at the bottom of the casing; and a plurality of spaced, horizontally arranged baffles in the shell.

7. In an oil and gas separator, in combination, an upright tank; a relatively large conductor pipe extending from near the bottom, through and above the top of the tank; said pipe being closed at the top and open at the bottom; fluid inlets in the pipe above the top of the tank; an oil outlet for the tank; a cylindrical casing in the upper portion of the pipe and above the inlet openings in the pipe; a cylindrical shell arranged axially within the casing and having inlet openings near the bottom; a plurality of spaced annular baffles extending between the casing and shell, each baffle having an opening therein; said casing having a plurality of inlet openings above the top baffle; a cylindrical baffle extending from the top baffle upwardly above the casing inlets; a gas conduit at the top of the casing communicating with the interior of the shell; an oil outlet at the bottom of the casing; and a plurality of spaced, horizontally arranged baffles in the shell.

In testimony that I claim the foregoing as my own, I have hereto affixed my signature.

ABE LINCOLN.